United States Patent [19]

Kubica et al.

[11] 4,169,494

[45] Oct. 2, 1979

[54] SELF-SUPPORTING MOTOR-VEHICLE TIRE

[76] Inventors: Wladyslaw Kubica, ul. Smoluchowskiego 8/15, Krakow, Poland, 30083; Oskar Schmidt, Kittsee (Burgenland), Austria

[21] Appl. No.: 791,206

[22] Filed: Apr. 27, 1977

[30] Foreign Application Priority Data

May 4, 1976 [PL] Poland .................................... 189286

[51] Int. Cl.² ............................................. B60C 17/00
[52] U.S. Cl. .................................... 152/310; 152/333; 152/338
[58] Field of Search ................ 152/9, 310, 312, 314, 152/321–322, 327–329, 331, 333, 334, 337–342

[56] References Cited

U.S. PATENT DOCUMENTS

| 634,866 | 10/1899 | Beasley | 152/328 X |
| 1,694,260 | 12/1928 | Hibbert | 152/322 X |

FOREIGN PATENT DOCUMENTS

| 489354 | 1/1953 | Canada | 152/327 |
| 59258 | 12/1941 | Denmark | 152/328 |
| 400585 | 6/1909 | France | 152/338 |
| 48041 | 10/1937 | France | 152/322 |

*Primary Examiner*—Joseph F. Peters, Jr.
*Assistant Examiner*—D. W. Underwood
*Attorney, Agent, or Firm*—Karl F. Ross

[57] ABSTRACT

A self-supporting motor-vehicle tire has an outer ring supporting the tread, an inner ring adapted to be fitted to a rim or to be placed upon a hub, and supporting elements uniting the said rings. The supporting elements are in the form of honeycomb-like cells running substantially parallel to the axis of the tire, the average wall thickness of the cells being less than approximately one-thirtieth of the width of the tire, while the average cross-sectional area of the interior of a cell, expressed in cm², is less than about one-tenth of the corresponding tire width measured in centimeters.

5 Claims, 7 Drawing Figures

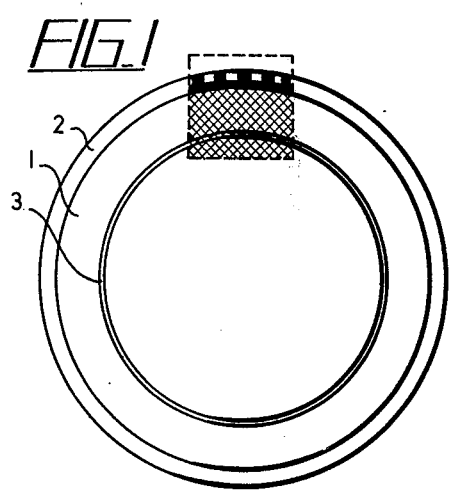
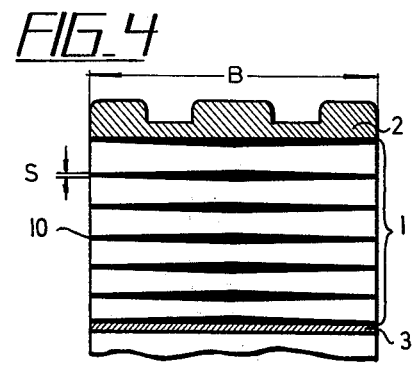
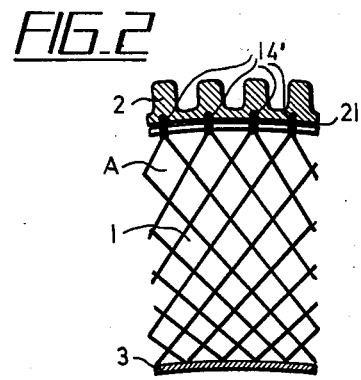
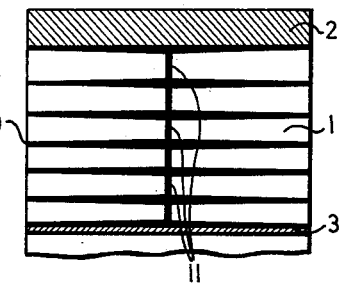
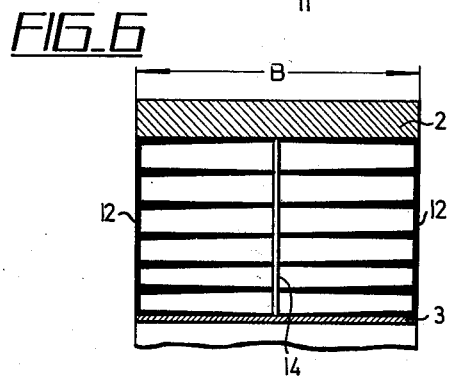
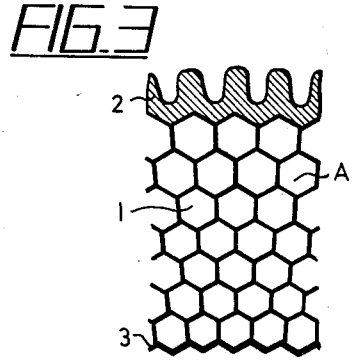
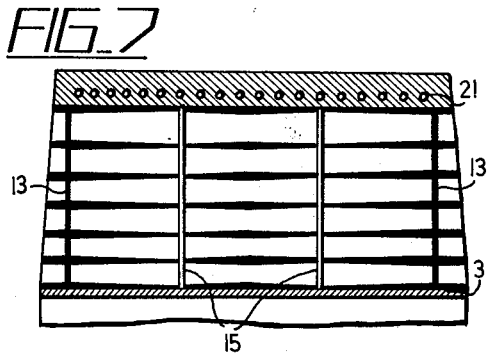

SELF-SUPPORTING MOTOR-VEHICLE TIRE

Our present invention relates to a self-supporting motor-vehicle tire having an outer ring supporting the tread, an inner ring adapted to be fitted to a rim or to be placed upon a hub, and supporting elements uniting the said rings.

Although many known types of pneumatic tires differ in certain design details, all of them are of a largely similar shape, namely a torus inwardly defined by a rim bed. The reason for this is that these tires are capable of carrying a load only because they are filled with compressed air, the said air being contained either in a so-called inner tube or, in the case of tubeless tires, in the cavity closed off by the rim. Tires of this kind are known to be subject to defects which frequently have catastrophic results, especially at high speeds.

In order to overcome this disadvantage, tires of the type mentioned above, but which do not need to be filled with air, have already been proposed. It has been found, however, that the supporting elements used in such tires did not provide the operational properties obtainable with pneumatic tires.

The object of our invention to provide a motor-vehicle tire having operational properties similar to those of pneumatic tires, but lacking the disadvantages thereof. In the case of tires of the type mentioned hereinabove, this purpose is achieved in that the supporting elements are in the form of honeycomb-like cells running substantially parallel to the axis of the tire, the average wall thickness of the said cells being less than about one-thirtieth of the width of the tire, while the average cross-sectional area of the interior of a cell, expressed in $cm^2$, is less than about one-tenth of the width of the tire, measured in centimeters.

The walls and interiors of the cells of our improved tire could also be longitudinally wedge-shaped. The said cells may also be sealed off airtight by means of lateral walls and the tire filled with air, although filling the tire with air is merely a supplementary measure since, if the tire develops a leak, the cells walls are fully capable of supporting the vehicle and allowing it to be driven.

The above and other features of our invention are described hereinafter in greater detail with reference to the accompanying drawing in which:

FIG. 1 shows a tire designed in accordance with the invention;

FIG. 2 shows the cell structure of a tire of this kind, on an enlarged scale;

FIG. 3 shows, in a view similar to that of FIG. 2, another embodiment of the invention; and FIGS. 4 to 7 show various tires according to the invention, each in cross section.

As shown in the drawing, a tire according to the invention consists of an outer ring 2 carrying the tread, an inner ring 3, and honeycomb-like cells 1 secured to both the outer ring 2 and the inner ring 3. Outer ring 2 corresponds to the tread area of a pneumatic tire and may be of a design and profile similar thereto, so that it will have satisfactory operational characteristics. As shown in FIGS. 2 to 7, outer ring 2 may also have a belt 21 which may be of a design similar to that used in pneumatic tires. The inner ring is either drawn onto a wheel rim or fitted to a wheel hub in some other manner.

It is possible, within the scope of the invention, to produce the three elements, namely the outer ring, the inner ring, and the cells, simultaneously from the same material, as shown in FIG. 3, for example. In this design, inner ring 3 is produced by suitable reinforcement of the cell walls constituting the internal periphery of the tire.

However, in order to optimize the properties of each of the said elements, it is also possible to make them of different materials. An example of a tire of this kind according to the invention is one in which the tread is made of rubber having a high coefficient of friction and high resistance to abrasion, the cells are made of a strong, resilient material, e.g. polyurethane, and the inner ring is the metal rim of the wheel. These three elements of the tire are made separately and are then united by any generally known method, for instance chemically, by means of suitable adhesives.

The most important element of a tire according to the invention is the annular cell structure 1 consisting of rows of longitudinal, thin-walled cells running parallel to one another, of honeycomb-like design.

According to FIG. 2, the cells are of rhomboidal cross section. According to FIG. 3, the size of the cross section of each hexagonal cell (as defined above) is less than one tenth of the tire width B (FIG. 6). Thus a tire having width B=16.5 cm has a cell structure in which the cross-sectional area A of a single cell is less than 1.65 $cm^2$.

FIG. 2 shows that a belt 21 is embedded into outer ring 2 by means of projections 14 extending from the cell structure.

As may be gathered from FIG. 4, cell walls 10 are wedge-shaped in longitudinal section, their wedge shape being such that the maximal thickness of walls 10 is located in the transverse midplane of the tire, the cell walls then tapering conically towards both sides. Although this conicity is relatively slight, it is sufficient to allow the tire, or the honeycomb cell structure, to be removed easily from the mold during manufacture. Furthermore, the wedge configuration of the interiors of the cells imparts a self-cleaning effect to the tire.

Minimal thickness S of cell walls 10 is less than one-thirtieth of tire width B, i.e. below 5.5 mm in the example given above. This ratio provides the tire with resilience and wearing properties similar to those obtained with good-quality pneumatic tires.

FIG. 5 shows a variant of the tire illustrated in FIG. 4, in which a central partition 11 is inserted in each cell.

In the designs shown in FIGS. 6 and 7, the cells are closed off airtight by means of lateral walls 12, 13. The cells communicate with one another through ducts 14,15 and it is therefore possible, by providing a suitable valve such as those used in pneumatic tires, to fill the tire with air.

The embodiment according to FIG. 6 comprises two symmetrically arranged rings of cells, the space between them forming the interconnecting duct 14.

The design illustrated in FIG. 7 is for heavy motor vehicles normally using double tires. In this case, the cell structure consists of three rings, the two outer rings being closed off by the side walls. In order to prevent, as far as possible, the inwardly offset walls from being damaged, they are slightly inset. This type of tire also has a belt 21.

We claim:

1. In a self-supporting motor-vehicle tire comprising an inner ring, an outer ring and a honeycomb-cell structure coaxially supporting said outer ring on said inner ring, said outer ring being provided with tread-forming peripheral ribs, the improvement wherein the cells of said structure extend axially in a multiplicity of annular rows centered on the ring axis and the number of cells in each of said rows substantially corresponds to the number of said ribs, said cells having walls whose average thickness is less than approximately one-thirtieth of the axial width of said rings and said structure, the average cross-sectional area of the interior of each cell expressed in $cm^2$ being less than about one-tenth of said axial width measured in centimeters.

2. The improvement defined in claim 1 wherein said cells are closed by lateral walls and are provided with ducts for the introduction of air.

3. The improvement defined in claim 1 wherein said cells are separated from one another by walls decreasing in thickness toward their ends.

4. The improvement defined in claim 1 wherein said cells are of tetragonal cross section.

5. The improvement defined in claim 1 wherein said cells are of hexagonal cross section.

* * * * *